US007552123B2

(12) United States Patent
Wade et al.

(10) Patent No.: US 7,552,123 B2
(45) Date of Patent: Jun. 23, 2009

(54) METHODS, SYSTEMS AND COMPUTER PROGRAM PRODUCTS FOR SYNCHRONIZING RECORDS IN BILLING AND SERVICE DATABASES

(75) Inventors: Amy L. Wade, Marietta, GA (US); Barbara Pasko, Lawrenceville, GA (US); Stephen P. Newman, Avondale Estates, GA (US); Karen H. Bowen, Birmingham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1014 days.

(21) Appl. No.: 10/640,159

(22) Filed: Aug. 13, 2003

(65) Prior Publication Data

US 2005/0038823 A1 Feb. 17, 2005

(51) Int. Cl.
*G06F 17/30* (2006.01)

(52) U.S. Cl. ..................................... 707/10; 707/104.1

(58) Field of Classification Search ............... 707/1–10, 707/100–104.1, 200–206; 705/34, 39, 40, 705/8, 35, 36, 37; 709/227; 715/753; 379/9, 379/9.02, 9.03, 29.01, 201.05, 201.12
See application file for complete search history.

(56) References Cited

U.S. PATENT DOCUMENTS

| | | | | | |
|---|---|---|---|---|---|
| 5,416,833 | A | * | 5/1995 | Harper et al. | 379/201.05 |
| 5,491,742 | A | * | 2/1996 | Harper et al. | 379/201.12 |
| 5,608,720 | A | * | 3/1997 | Biegel et al. | 370/249 |
| 5,644,619 | A | * | 7/1997 | Farris et al. | 379/29.01 |
| 5,687,212 | A | * | 11/1997 | Kinser, Jr. et al. | 379/9.03 |
| 5,696,906 | A | * | 12/1997 | Peters et al. | 705/34 |
| 5,758,083 | A | | 5/1998 | Singh et al. | 395/200.53 |
| 5,758,150 | A | | 5/1998 | Bell et al. | 395/610 |
| 5,790,633 | A | * | 8/1998 | Kinser, Jr. et al. | 379/9.02 |
| 5,790,634 | A | * | 8/1998 | Kinser, Jr. et al. | 379/29.01 |
| 5,953,389 | A | * | 9/1999 | Pruett et al. | 379/9 |
| 5,978,813 | A | | 11/1999 | Foltz et al. | 707/201 |
| 6,081,806 | A | | 6/2000 | Chang et al. | 707/8 |
| 6,178,172 | B1 | | 1/2001 | Rochberger | 370/395 |
| 6,219,648 | B1 | * | 4/2001 | Jones et al. | 705/8 |
| 6,295,540 | B1 | * | 9/2001 | Sanschagrin et al. | 707/201 |
| 6,330,598 | B1 | * | 12/2001 | Beckwith et al. | 709/223 |
| 6,374,262 | B1 | | 4/2002 | Kodama | 707/201 |
| 6,377,993 | B1 | * | 4/2002 | Brandt et al. | 709/227 |
| 6,516,327 | B1 | | 2/2003 | Zondervan et al. | 707/200 |
| 6,947,948 | B2 | * | 9/2005 | Wang et al. | 707/102 |
| 6,957,221 | B1 | * | 10/2005 | Hart et al. | 707/100 |
| 7,051,052 | B1 | * | 5/2006 | Shapiro et al. | 707/204 |
| 7,225,249 | B1 | * | 5/2007 | Barry et al. | 709/227 |

(Continued)

*Primary Examiner*—Diane Mizrahi
(74) *Attorney, Agent, or Firm*—Myers Bigel Sibley & Sajovec, P.A.

(57) ABSTRACT

Service and billing databases can be synchronized by accessing first data of a selected type in the billing database including billing data associated with network services provided to subscribers of the network to provide billing data that includes selected billing data of the selected type. Second data of the selected type is accessed in the service database including service data associated with maintaining the services to the subscriber to provide selected service data of the selected type. The service database is modified to include selected billing data that is present in the selected billing data and absent from the selected service data. The service database is modified to remove selected service data that is absent from the selected billing data.

24 Claims, 3 Drawing Sheets

U.S. PATENT DOCUMENTS

2004/0088251 A1* 5/2004 Moenickheim et al. ....... 705/39
2004/0143546 A1* 7/2004 Wood et al. .................. 705/40
2005/0015292 A1* 1/2005 Wilson et al. .................. 705/9
2005/0034079 A1* 2/2005 Gunasekar et al. .......... 715/753

* cited by examiner

METHODS, SYSTEMS AND COMPUTER PROGRAM PRODUCTS FOR SYNCHRONIZING RECORDS IN BILLING AND SERVICE DATABASES

FIELD OF THE INVENTION

The invention generally relates to the field of information systems, and more particularly, to methods, systems, and computer program products for databases.

BACKGROUND

The establishment and management of services to subscribers of communications networks can involve extensive use of databases. In particular, databases for communications networks may be used to manage billing information as well as service information that can be used to repair and maintain the services offered to subscribers.

Many of the databases may be operated independent of one another. For example, a new Subscriber may contact a customer service representative to initiate new services, such as new telephone service or new data communications service. The customer service representative can use a billing database to record the new subscriber billing information, such as the customer's name, address and what types of services for the customer has subscribed to (such as caller ID, call waiting, and call forwarding, etc.) for which the subscriber will be billed. The customer service representative may also enter information that identifies the subscriber as receiving data communications services, such as Asymmetric Digital Subscriber Line (ADSL) services. The data entered into the billing database can be used to generate invoices for the subscriber's services.

The data entered into the billing database can also be provided "downstream" service databases that can be used to maintain and repair the services provided to the subscriber. For example, if the subscriber receives ADSL service, a services database commonly referred to as a Network Services Database (NSDB) may incorporate the billing data from the billing database into other information which describes the particulars of how the service is provide to the subscriber. For example, in addition to the billing data, the NSDB can include detailed information regarding message trunks, special services, carrier circuits and other services that can be used to maintain and repair these services provided to the subscriber.

Service personnel may be called on to investigate and repair the services when, for example, trouble has been reported by the subscriber or when other systems indicate action may be needed with respect to a particular service. Accordingly, the service personnel may access the service databases that store the service data associated with the service for which trouble has been reported. Over the course of a repair, the service personnel may modify the data in the service database so that the data in the billing database and the data in the service database become "unsynchronized" such that the data in the service database may be inaccurate with respect to the billing database. Accordingly, there is a need to improve the management of billing and service data associated with communication networks.

SUMMARY

Embodiments according to the invention can provide methods, systems, and computer program products for synchronizing selected data in billing and service databases. Pursuant to these embodiments, a determination can be made that a selected type of data, that is included in both the billing database and a service database, can be used to synchronize the data in the service database to the data in the billing database. The determination can be based on which type of services are causing data in the billing database and the service database to become unsynchronized with one another.

In some embodiments according to the invention, first data of a selected type can be accessed in a billing database that includes billing data associated with network services provided to subscribers of the network to provide billing data that includes selected billing data of the selected type. Second data, of the same type, can be accessed in a service database that includes service data associated with maintaining the services to the subscriber to provide selected service data of the selected type. The service database can be modified to include selected billing data that is present in the selected billing data and absent from the selected service data. The service database can be modified to remove the selected service data that is absent from the selected billing data.

In some embodiments according to the invention, the selected billing data can be compared to the selected service data to determine the selected billing data to be included in the service database and to determine the selected service data to be removed from the service database. In some embodiments according to the invention, the selected billing data can be compared to the selected service data using a database manager computer program.

In some embodiments according to the invention, the modifications to the service database can avoid modifying the billing database. In some embodiments according to the invention, steps can be taken to avoid modifying the service database to include billing data of a type other than the selected type included in the billing database that is absent from the service database. In some embodiments according to the invention, steps can be taken to avoid modifying the service database to remove billing data of a type other than the selected type absent from the billing database.

In some embodiments according to the invention, the selected type can include at least one of a circuit identifier and a Universal Service Order Code (USOC). In some embodiments according to the invention, the service database can include at least one of a Loop Maintenance and Operations System (LMOS), a Network Services Database (NSDB), a Trunk information Record Keeping System (TIRKS), and a Work Force Administration/Control System (WFA/C). In some embodiments according to the invention, the billing database can be at least one of a Carrier Access Billing System (CABS), a Customer Record Information System (CRIS), and a combination of the CABS and CRIS. In some embodiments according to the invention, the selected type of data can be associated with a service provided to the subscriber that is included in the billing database and the service database.

In other embodiments according to the invention, a determination can be made for a selected type of data to be synchronized in a billing database that includes billing data associated with network services provided to subscribers of the network and at least one service data base that each include service data associated with maintaining the services to the subscriber. The billing database can be queried for first data of the selected type to provide billing data that includes selected billing data of the selected type. The service database can be queried for second data of the selected type to provide selected service data of the selected type. The selected billing data can be compared to the selected service data to determine the selected billing data to be included in the service database and to determine the selected service data to be removed from the service database. The selected billing data that is present in the selected billing data and absent from the selected service data service database can be included in the service database. The selected service data that is absent from the selected billing data can be removed from the service database. Modifications to the billing database can be avoided. Modifications to the service database to include billing data of a type other than the selected type included in the billing database that is absent from the service database can also be avoided.

DESCRIPTION OF EMBODIMENTS ACCORDING TO THE INVENTION

Figure 1:
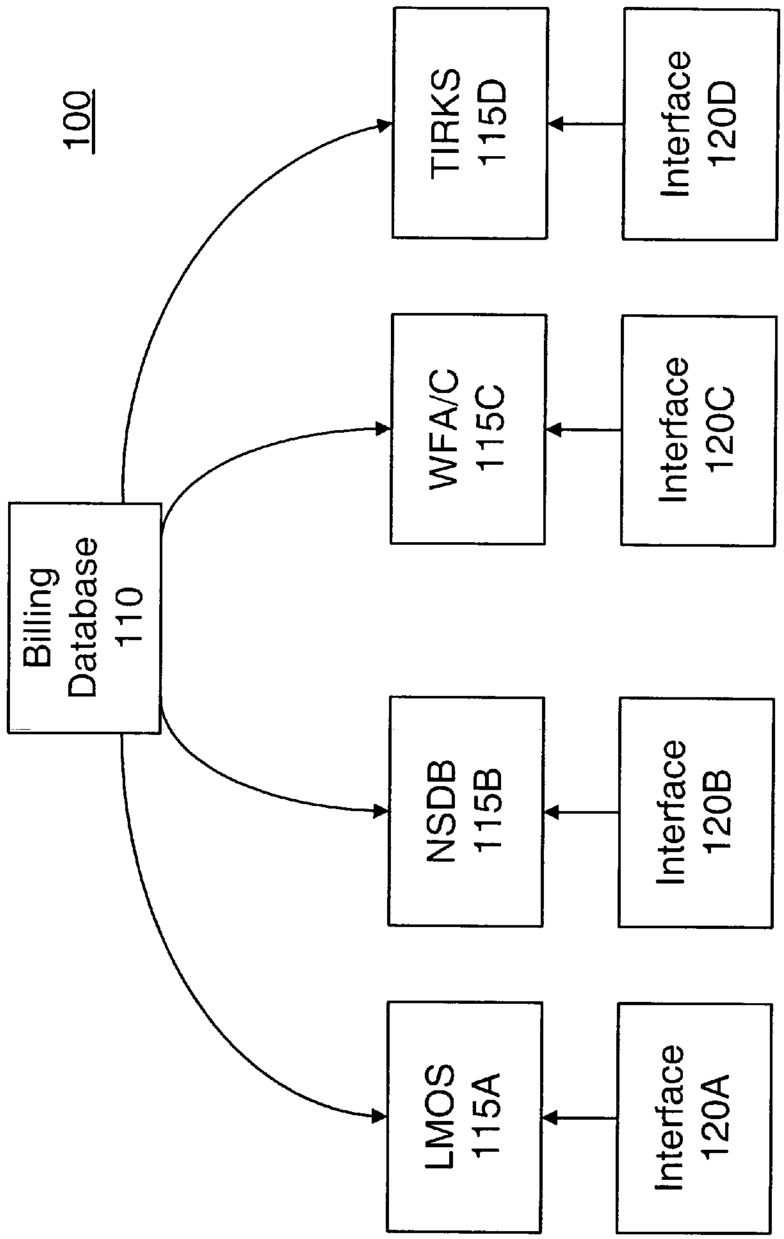
FIG. 1 is a block diagram that illustrates embodiments of methods, systems, and computer program products for the synchronization of selected data in billing and service databases according to the invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

It will be understood that although the terms first and second are used herein to describe various elements, these elements should not be limited by these terms. These terms are only used to distinguish one element from another element. Thus, a first element discussed below could be termed a second element, and similarly, a second element may be termed a first element without departing from the teachings of this disclosure.

As will be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code or “code” for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The code may execute entirely on one or more computer systems, or it may execute partly on a server and partly on a client within a client device, or as a proxy server at an intermediate point in a communications network. In the latter scenario, the client device may be connected to a server over a LAN or a WAN (e.g., an intranet), or the connection may be made through the Internet (e.g., via an Internet Service Provider). The invention may be embodied using various protocols over various types of computer networks.

The invention is described below with reference to block diagrams and a flowchart illustration of methods, systems and computer program products according to embodiments of the invention. It is understood that each block of the block diagrams and the flowchart, and combinations of blocks in the block diagrams and the flowchart, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagrams and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Embodiments according to the invention can provide methods, systems, and computer program products for synchronizing selected data in billing and service databases. In particular, a determination can be made that a selected type of data that is included in both the billing database and a service database can be used to synchronize the data in the service database to the data in the billing database. The determination can be based on which type of services are causing data in the billing database and the service database to become unsynchronized with one another.

For example, as ADSL services become more popular, new subscribers are added to the billing database. Consequently, the data associated with the new subscribers is provided downstream to the service databases. Over time, service personnel may introduce inconsistencies into the data in the service database through the course of maintaining and repairing the ADSL service. A determination can be made as to which type of data is included in both the billing database and in the service databases associated with ADSL, such as a Universal Service Order Code, (USOC).

Queries can be provided to the billing database that will provide billing data that includes selected billing data of the selected type (such as the USOC which is associated with ADSL). A similar query can be made to the service databases associated with ADSL to provide service data that includes selected service data of the same type extracted from the billing database (e.g., the USOC). The query to the billing database and the query to the service database can therefore provide respective which each includes data of the same type (i.e. data which is associated with ADSL).

The respective data from the billing database and the service database can be compared to determine which records in the service database are to be removed and which records included in the billing database are to be added to the service database. Selected data in the service database can, therefore, be sychronized selected data in the billing database to reduce inconsistencies introduced into the service database through, for example, periodic maintenance and repairs that are initiated and tracked by a separate interface to the service database.

As used herein, the term "synchronized" or "synchronizing" includes removing a record from a first database, such as the service database, if the data that is included in the first database is not included in a second database, such as the billing database. The term synchronization can also include adding a record that appears in the second database, such as the billing database, to the first database, such as the service database. Furthermore, synchronization will be understood to mean that other types of data which may be inconsistent between the first and second databases may be unmodified by the synchronization described herein.

Although embodiments according to the invention are described herein reference to particular billing databases and service databases, it will be understood that embodiments according to the invention can be utilized to synchronized and merge any type of billing database with a service database.

FIG. 1 is a block diagram that illustrates embodiments of methods, systems, and computer program products for synchronizing selected service data with selected billing data according to the invention. As shown in FIG. 1, service for a new subscriber to a communications network can be initiated in a database system 100 by entering billing data into a billing database 110. The communications network can be a Public Switched Telephone Network (PSTN), although it will be understood that the communications network can be another type network.

The billing data can include the name and address of the subscriber, a circuit ID (commonly referred to as a telephone number) associated with the subscriber's service, as well as a description of other types of services such as call waiting, call transfer, call forward, and ADSL etc. The service may be initiated by a customer representative responding to inquiries from potential subscribers via a telephone or electronically through a network. Alternatively, service may be initiated through an online form over the Internet.

The billing database 110 can be any database that stores information related to how subscribers to the subscriber database system 100 are billed for services. For example, the billing database 110 can include the name and address information for subscribers, the circuit ID of the subscriber, as well as any additional information that identifies services (such as ADSL, ISDN, WATS, etc.) received by the subscriber.

The billing database 110 can include one or more separate databases that store information related to different types of subscribers. In some embodiments according to the invention, the billing database 110 can include a database that is sometimes referred to as a Customer Record Information System (CRIS) that stores information related to retail customers (i.e. end users of the communications network). In some embodiments according to the invention, the billing database 110 can include a database that is sometimes referred to as a Carrier Access Billing System (CABS) that can store information related to other service providers that ultimately provide service to end users (i.e., wholesale subscribers to the communication network).

The billing data is provided downstream from the billing database 110 to service databases 115A-115D. The service databases 115A-115D can include information that describes technical details associated with the subscribers services. For example, some service databases can include information as to which line pair is used to provide the subscriber's services, information about transfer circuits, and information about troubleshooting/repair of services, etc.

In some embodiments according to the invention, one of the service databases 115A-115D can be what is sometimes referred to as a Loop Maintenance and Operations Systems (LMOS) database which can store information associated with the telephone line that connects a subscribers telephone to a switch at a central office (i.e., POTS service), as well as where the line may be connected with other telephone lines or trunks (i.e., "the loop"). The LMOS database may also include information associated with the initiation, status, etc. associated with maintenance and repairs to the loop.

In some embodiments according to the invention, one of the service databases 115A-115D can be what is sometimes referred to as a Network Services Database (NSDB) that stores information such as information related to message trunks, special services, carrier circuits, and non-design services, and Plain Old Telephone Services (POTS).

In some embodiments according to the invention, one of the service databases 115A-115D can be a Trunk Information Record Keeping System (TIRKS) which is a system that can support network provisioning for special service circuits, message trunks, and carrier circuits. TIRKS may provide inventory management of facilities and equipment. TIRKS can also include information related to transmission technologies including SONET, self-healing rings, digital circuit hierarchy, analog voice circuits, and European hierarchy standards. TIRKS is well known to those having skill in the art and is described, for example, in U.S. pat. No. 6,295,540 to Sanschagrin, et al. entitled Alignment of tirks using network manager, the entire disclosure of which is incorporated herein by reference.

In some embodiments according to the invention, one of the service databases 115A-115D can be a Work Force Administration/Control (WFA/C) system that can store information related to the location and history associated with trouble reported to the subscriber service. WFA/C is a legacy system that was originally developed for the Bell telephone system, and is now used by regional operators of the PSTN and others in the telecommunications industry. WFA/C is a software product available from Bell Communications Research (Bellcore), Murray Hill, N.J. For information concerning WFA/C.

WFA/C is well known to those having skill in the art and is described, for example, in U.S. Pat. No. 6,219,648 to Jones et al. entitled Apparatus and Method for Monitoring Progress of Customer Generated Trouble Tickets; U.S. Pat. No. 5,953, 389 to Pruett et al. entitled Combination System for Provisioning and Maintaining Telephone Network Facilities in a Public Switched Telephone Network; U.S. Pat. No. 5,881,131 to Farris et al. entitled Analysis and Validation System for Provisioning Network Related Facilities; U.S. Pat. No. 5,790, 634 to Kinser, Jr. et al. entitled Combination System for Proactively and Reactively Maintaining Telephone Network Facilities in a Public Switched Telephone System; U.S. Pat. No. 5,790,633 to Kinser, Jr. et al. entitled System for Proactively Maintaining Telephone Network Facilities in a Public Switched Telephone Network, U.S. Pat. No. 5,687,212 to Kinser, Jr. et al. entitled System for Reactively Maintaining Telephone Network Facilities in a Public Switched Telephone Network; U.S. Pat. No. 5,644,619 to Farris et al. entitled Analysis and Validation System for Provisioning a Public Switched Telephone Network; U.S. Pat. No. 5,491,742 to Harper et al. entitled Method and Apparatus for Provisioning a Public Switched Telephone Network; and U.S. Pat. No. 5,416,833 to Harper et al. entitled Method and Apparatus for Provisioning a Public Switched Telephone Network. Accordingly, WFA/C need not be described in detail herein. It will be understood that other types of service databases can also be used.

The subscriber database system 100 also includes service interfaces 120A-120D which can be used to access each of the respective service databases 115A-115D to, for example, initiate, track, and update information related to maintenance and repair of subscriber services. The service interfaces 120A-120D can be used to input and update information in the service databases 115A-115D which can introduce inconsistencies between the billing database 110 and the respective service databases 115A-115D.

Figure 2:
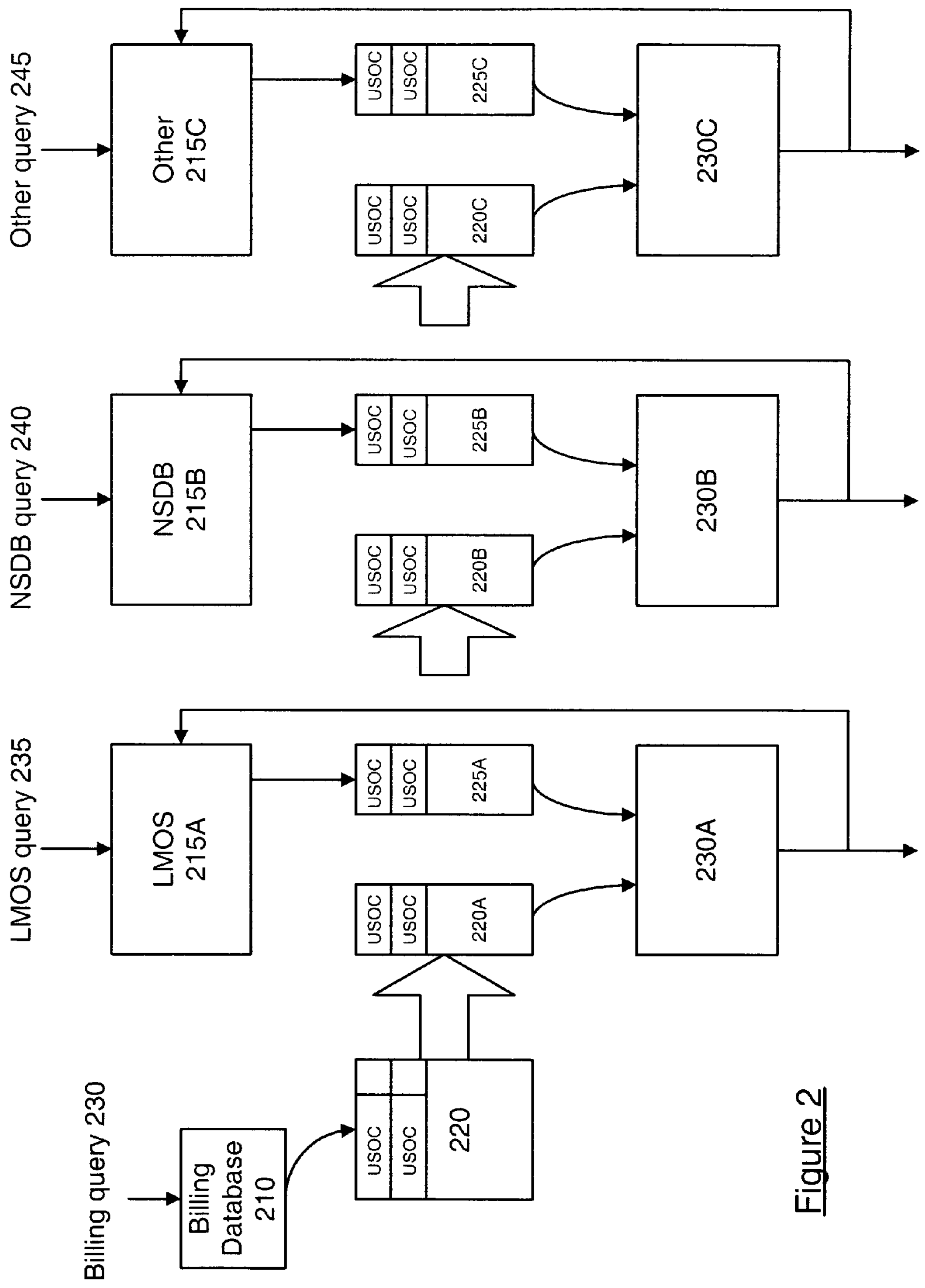
FIG. 2 is a block diagram that illustrates embodiments of methods, systems, and computer program products for synchronizing selected data in billing and service databases according to the invention.

FIG. 2 is a block diagram the illustrates embodiments of methods, systems, and computer program products for synchronizing selected service data with selected billing data according to the invention. According to FIG. 2, a billing database 210 includes billing data that is associated with services provided to subscribers of a communications network. The billing data includes selected billing data of a type which is included in service databases used to maintain and repair the subscriber services. A billing system query 230 is created to extract selected billing data from the billing database 210. In some embodiments according to the invention, the billing system query 230 can be implemented using a QMF query utility.

In some embodiments according to the invention, a database SYNCSORT utility can be used to delete extraneous information from the selected billing data that is extracted from the billing database. The SYNCSORT utility can also be used to change the format of the selected billing data extracted from the billing database. In some embodiments according to the invention, the selected billing data extracted from the billing database 210 can be relocated to system or area of a system which may enable more convenient processing of the data. In some embodiments according to the invention, the selected billing data can be relocated using a BFTS utility. In other embodiments according to the invention, the selected billing data can be relocated using FTP, email or relocated physically on a writable media, such as a compact disk.

If the billing database 210 includes a CABS type billing database, a database manager can be used to convert the CABS type records to a format which is compatible with the CRIS type billing records which can then be merged into a common file. A BFTS utility can then be used to move the combined file to a site which is more convenient using, for example, FTP, email or a CD. Other means may also be used.

The data selected to be extracted from the billing database 210 can be based on a determination of the type of data which is included in both the billing database 210 and in one or more downstream service databases used for a particular service provided by the network. For example, if data in the service databases associated with maintaining and repairing ADSL services has become unsynchronized with data in the billing database 210, the billing system query 230 can be created to extract a type of billing data from the billing database 210 that is also included in the service databases are used to repair and maintain ADSL services (Such as a Network Services Database).

The data can be extracted from the billing database 210 on a particular date so that service data can be extracted from analogous databases on the same date as discussed herein. Extracting the data from the billing and service databases on the same date may reduce the likelihood that changes made to both of the databases may appear in only one of the databases if the data is extracted at different times. In some embodiments according to the invention, the selected data is extracted at a specified time on a specified date. Furthermore, guidelines for use of the databases associated with the communications network may specify that changes to the databases may only occur during authorized times. In some embodiments according to the invention, the respective databases to be synchronized can be archived wherein the processing discussed herein is performed on the archived versions of the databases.

In some embodiments according to the invention, personnel responsible for operation and/or maintenance of the databases can be notified of what data is to be extracted from the respective databases and, further, when the data is to be extracted, such as once a month. It will be understood that the personnel responsible for operation and/or maintenance of the database can be notified using, for example, written instructions or via email or another electronic source. The notification can include instruction as to which data is to be extracted from the database for which they are responsible.

In the case of ADSL, the billing system query 230 can be created to access selected billing data, such as a Universal Service Order Code (USOC), which can indicate that the subscriber is being billed for ADSL service. In particular, the USOC can be information, in a coded form, for billing purposes by the local telephone company pertaining to information on service orders and service equipment records. As understood by those skilled in the art, the USOC is included in the service databases that are downstream from the billing database 210 and are used to maintain and repair subscriber's ADSL services. Accordingly, the USOC will be included in both the billing database 210 as well as in at least some of the service databases. Moreover, the service databases should not include any record which is not in the billing database 210.

The billing query 230 is used to access the selected billing data 220 from the billing database 210. It will be understood that the selected billing data 220 can also include other types of data such as name, address, circuit ID etc. associated with the USOC. The selected billing data 220 can be reformatted to provide the selected billing data in a form which is compatible with the format used to store the same type of data in the corresponding service database. For example, the selected billing data 220 (USOC) may be reformatted to provide a reformatted selected billing data 220A that is compatible with the format of the USOC as it appears in one of the service databases. Furthermore, the selected billing data 220 can be reformatted to provide a different format for each of the service databases that is to be synchronized with the billing database 210. For example, as shown in FIG. 2, the selected billing data 220 can be reformatted to provide reformatted versions 220A and 220B that match the format of the USOC in the NSDB and in other databases.

An LMOS query 235 can also be created to extract the same type of data from the LMOS database 215A as was extracted from the billing database 210. The LMOS query 235 can be created by a database manager using the same instructions provided as the basis for the billing query 235. For example, in the case described above in reference to the USOC, the LMOS query 235 may be structured to access the USOC in the LMOS database 215A to provide selected service data 225A. The data extracted by the LMOS query 235 may also be reformatted to, for example, insert characters so as to facilitate a comparison between the selected service data extracted from the LMOS database 215A.

An NSDB query 240 may similarly may be constructed to extract the same type of data (e.g., USOC) from an NSDB database 215B to provide the selected service data 225B. The NSDB 240 can be created based on the same instructions used to create the billing query 230 and the LMOS query 235. It will be understood that similar other queries 245 can be provided to other types of databases 215C to provide selected service data 225C each of which match the format of the reformatted USOC data provided from the billing database 210.

Each of the selected service data 225A-225C is compared to the respective selected billing data 220A-220C to determine records 230A-230C that should be either removed from the service databases 215A-215C or included in the service database 215A-215C based on whether a corresponding entry is included in the billing database 210. For example, in the case of the LMOS database 215A, if the selected service data 225A includes USOCs that are not also included in the selected billing data 220A, the records in the LMOS database 215A associated with the unmatched USOCs in the selected service data 225A are removed from the LMOS database 215A. Similarly, if USOCs included in the selected billing data 220A are not included in the selected service data 225A, the records associated with the unmatched USOCs in the billing database 210 are included in the LMOS database 215A to thereby synchronize the selected data in the service database with the selected data in the billing database 210.

The comparison of the selected service data with the selected billing data can be performed using a SYNCMERG process in MSP which can be carried out, for example, on the same day. The SYNCMERG can synchronize and merge data in the respective databases to produce respective outputs for NSDB as well as the LMOS database. In particular, each of the comparisons can produce separate files which describe which records match between the billing database and the respective service database and can, further specify which records in the billing database do not appear in the service databases and which records in the service databases are not included in the billing database. Accordingly, these files can be used to add records to the service database and deleted records from the service database. The files which describe the records to be deleted and added can be provided to the WFA/C database as well as to the TIRKS database. WFA/C and TIRKS can use these files produced by the SYNC MERG process to update their respective databases to synchronize the service data therein with the selected billing data. Similarly, the output of the SYNC MERG process can also be product to the LMOS database which can then be updated to synchronize the service data therein with the selected billing data.

Figure 3:
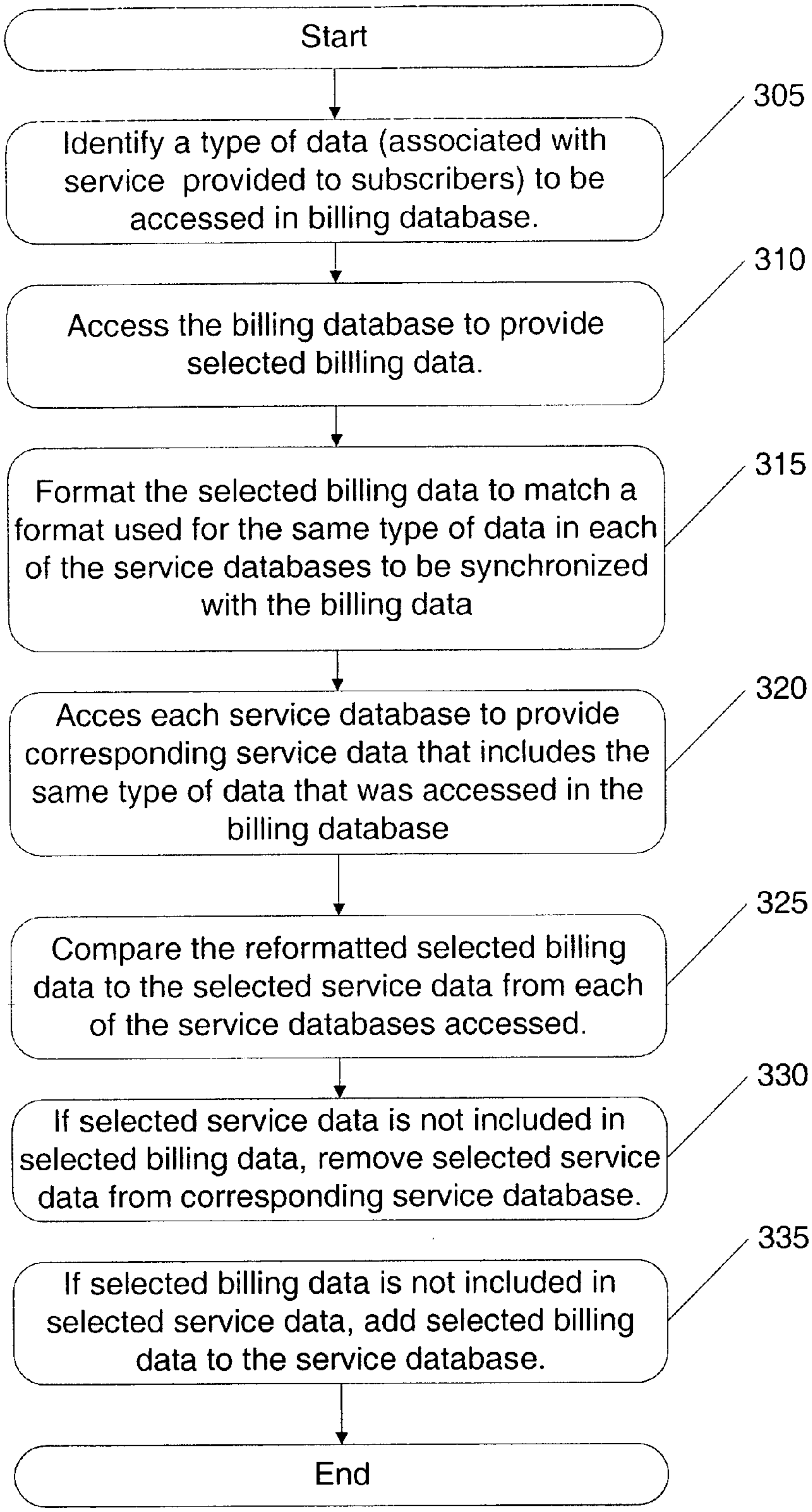
FIG. 3 is a flowchart that illustrates operations of embodiments of methods, systems, and computer program products for synchronizing selected data in billing and service databases according to the invention.

FIG. 3 is a flowchart that illustrates operations of embodiments according to the invention. In particular, a type of selected data associated with a service provided to subscribers is identified to be accessed in the billing database (block 305). As discussed above, the data selected to be extracted from the billing database can be based on a determination of the type of data which is included in both the billing database and in one or more downstream service databases used for a particular service provided by the communications network.

The billing database is accessed to provide billing data that includes selected billing data, such as a USOC, from the billing database (block 310). The selected billing data is formatted to remove any excess data and to format the remaining billing data to match a format for each of the service databases to be synchronized with the billing data (block 315). Each of the service databases is accessed to provide corresponding service data that includes the same type of data that was accessed in the billing database (block 320). The selected billing data is compared to the selected service data from each of the service databases accessed in block 320 (block 325).

If any of the selected service data is not included in the selected billing data, that selected service data is removed from the corresponding service database (block 330). If any of the selected billing data is not included in the selected service data, the selected service data is included in the service database (block 335). It will be understood that some service data which may be erroneous (i.e., is not included in the billing database) may be left intact and not removed from the service database. In particular, in some embodiments according to the invention, only the data type that is selected for synchronization with the billing system is modified (i.e., added or removed from) the service database.

As discussed above, in embodiments according to the invention, a determination can be made that a selected type of data, that is included in both the billing database and a service database, can be used to synchronize the data in the service database to the data in the billing database. The determination can be based on which type of services are causing data in the billing database and the service database to become unsynchronized with one another.

Many alterations and modifications may be made by those having ordinary skill in the art, given the benefit of present disclosure, without departing from the spirit and scope of the invention. Therefore, it will be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A method of synchronizing data in service and billing databases, the method comprising:

accessing, using a computer processor, first data of a selected type in a billing database including billing data associated with network services provided to subscribers of the network to provide billing data that includes selected billing data of the selected type;

accessing second data of the selected type in a service database including service data associated with maintaining the services to the subscriber to provide selected service data of the selected type;

modifying the service database to include selected billing data when the selected billing data is absent from the selected service data; and modifying the service database to remove selected service data when the selected service data is absent from the selected billing data to synchronize the service and billing databases, wherein the service database comprises at least one of a Loop Maintenance and Operations System (LMOS), a Network Services Database (NSDB), a Trunk Information Record Keeping System (TIRKS), and a Work Force Administration/Control System (WFA/C); and wherein the billing database comprises at least one of a Carrier Access Billing System (CABS), a Customer Record Information System (CRIS), and a combination of the CABS and CRIS.

2. A method according to claim 1 wherein the steps of modifying the service database to include selected billing data and modifying the service database to remove selected service data are preceded by:

comparing the selected billing data to the selected service data to determine the selected billing data to be included in the service database and to determine the selected service data to be removed from the service database.

3. A method according to claim 2 wherein the comparing comprises comparing the selected billing data to the selected service data using a database manager computer program.

4. A method according to claim 1 further comprising:

avoiding modifying the billing database.

5. A method according to claim 1 further comprising:

avoiding modifying the service database to include billing data of a type other than the selected type included in the billing database that is absent from the service database.

6. A method according to claim 5 further comprising:

avoiding modifying the service database to remove billing data of a type other than the selected type absent from the billing database.

7. A method according to claim 1 wherein the selected type comprises at least one of a circuit identifier and a Universal Service Order Code (USOC).

8. A method according to claim 1 wherein the selected type is associated with a service provided to the subscriber that is included in the billing database and the service database.

9. A method of synchronizing data in service and billing databases, the method comprising:

determining a selected type of data to be synchronized in a billing database that includes billing data associated with network services provided to subscribers of the network and at least one service data base that each include service data associated with maintaining the services to the subscriber;

querying, using a computer processor, the billing database for first data of the selected type to provide billing data that includes selected billing data of the selected type;

querying the service database for second data of the selected type to provide selected service data of the selected type;

comparing the selected billing data to the selected service data to determine the selected billing data to be included in the service database and to determine the selected service data to be removed from the service database;

including the selected billing data that is absent from the selected service data in the service database;

removing the selected service data that is absent from the selected billing data from the service database;

avoiding modifying the billing database; and avoiding modifying the service database to include billing data of a type other than the selected type included in the billing database that is absent from the service database to synchronize the service and billing databases, wherein the service database comprises at least one of a Loop Maintenance and Operations System (LMOS), a Network Services Database (NSDB), a Trunk Information Record Keeping System (TIRKS), and a Work Force Administration/Control System (WFA/C); and wherein the billing database comprises at least one of a Carrier Access Billing System (CABS), a Customer Record Information System (CRIS), and a combination of the CABS and CRIS.

10. A method according to claim 9 wherein the comparing comprises comparing the selected billing data to the selected service data using a database manager computer program.

11. A method according to claim 9 further comprising:

avoiding modifying the service database to remove billing data of a type other than the selected type absent from the billing database.

12. A method according to claim 9 wherein the selected type comprises at least one of a circuit identifier and a Universal Service Order Code (USOC).

13. A system for synchronizing data in service and billing databases, the system comprising:

computer processor means for determining a selected type of data to be synchronized in a billing database that includes billing data associated with network services provided to subscribers of the network and at least one service data base that each include service data associated with maintaining the services to the subscriber;

computer processor means for querying the billing database for first data of the selected type to provide billing data that includes selected billing data of the selected type;

computer processor means for querying the service database for second data of the selected type to provide selected service data of the selected type;

computer processor means for comparing the selected billing data to the selected service data to determine the selected billing data to be included in the service database and to determine the selected service data to be removed from the service database;

computer processor means for including the selected billing data that is absent from the selected service data in the service database;

computer processor means for removing the selected service data that is absent from the selected billing data from the service database;

computer processor means for avoiding modifying the billing database; and computer processor means for avoiding modifying the service database to include billing data of a type other than the selected type included in the billing database that is absent from the service database to synchronize the service and billing databases, wherein the service database comprises at least one of a Loop Maintenance and Operations System (LMOS), a Network Services Database (NSDB), a Trunk Information Record Keeping System (TIRKS), and a Work Force Administration/Control System (WFAIC); and wherein the billing database comprises at least one of a Carrier Access Billing System (CABS), a Customer Record Information System (CRIS), and a combination of the CABS and CRIS.

14. A system according to claim 13 wherein the means for comparing comprises means for comparing the selected billing data to the selected service data using a database manager computer program.

15. A system according to claim 13 further comprising:

means for avoiding modifying the service database to remove billing data of a type other than the selected type absent from the billing database.

16. A system according to claim 13 wherein the selected type comprises at least one of a circuit identifier and a Universal Service Order Code (USOC).

17. A computer program product, executed by a computer processor, for synchronizing data in service and billing databases comprising:

a computer readable medium having computer readable program code embodied therein, the computer readable program code comprising:

computer readable program code configured to access first data of a selected type in a billing database including billing data associated with network services provided to subscribers of the network to provide billing data that includes selected billing data of the selected type;

computer readable program code configured to access second data of the selected type in a service database including service data associated with maintaining the services to the subscriber to provide selected service data of the selected type;

computer readable program code configured to modify the service database to include selected billing data when the selected billing data is and absent from the selected service data; and computer readable program code configured to modify the service database to remove selected service data when the selected service data is absent from the selected billing data to synchronize the service and billing databases, wherein the service database comprises at least one of a Loop Maintenance and Operations System (LMOS), a Network Services Database (NSDB), a Trunk Information Record Keeping System (TIRKS), and a Work Force Administration/Control System (WFA/C); and wherein the billing database comprises at least one of a Carrier Access Billing System (CABS), a Customer Record Information System (CRIS), and a combination of the CABS and CRIS.

18. A computer program product according to claim 17 further comprising:

computer readable program code configured to compare the selected billing data to the selected service data to determine the selected billing data to be included in the service database and to determine the selected service data to be removed from the service database.

19. A computer program product according to claim 18 wherein the computer readable program code configured to compare comprises computer readable program code configured to compare the selected billing data to the selected service data using a database manager computer program.

20. A computer program product according to claim 17 further comprising:

computer readable program code configured to avoid modifying the billing database.

21. A computer program product according to claim 17 further comprising:

computer readable program code configured to avoid modifying the service database to include billing data of a type other than the selected type included in the billing database that is absent from the service database.

22. A computer program product according to claim 21 further comprising:

computer readable program code configured to avoid modifying the service database to remove billing data of a type other than the selected type absent from the billing database.

23. A computer program product according to claim 17 wherein the selected type comprises at least one of a circuit identifier and a Universal Service Order Code (USOC).

24. A computer program product according to claim 17 wherein the selected type is associated with a service provided to the subscriber that is included in the billing database and the service database.

* * * * *

UNITED STATES PATENT AND TRADEMARK OFFICE

CERTIFICATE OF CORRECTION

PATENT NO. : 7,552,123 B2 
APPLICATION NO. : 10/640159
DATED : June 23, 2009
INVENTOR(S) : Wade et al.

It is certified that error appears in the above-identified patent and that said Letters Patent is hereby corrected as shown below:

Column 12, Claim 13, Line 48: Please correct "(WFAIC)" to read -- (WFA/C) --

Signed and Sealed this

First Day of September, 2009

David J. Kappos
*Director of the United States Patent and Trademark Office*